Oct. 26, 1965    J. BAUDE    3,214,610
TIMING CONTROL MEANS
Filed May 1, 1963

United States Patent Office 3,214,610
Patented Oct. 26, 1965

3,214,610
TIMING CONTROL MEANS
John Baude, Milwaukee, Wis., assignor to Allis-Chalmers Manufacturing Company, Milwaukee, Wis.
Filed May 1, 1963, Ser. No. 277,298
13 Claims. (Cl. 307—88.5)

This invention relates to timing control circuits particularly to circuits that store electrical energy at a predetermined rate and respond to the level of stored energy to produce a signal.

This invention is applicable to timing control circuits that receive an input, usually of a controlled amount in response to some condition, and store this input as electrical energy. When this stored electrical energy reaches a certain level it produces an output signal. This signal may be used to place a subsequent circuit or device in operation, for example a trigger stage in an overcurrent relay, to perform a certain function.

The control circuit of this invention responds to an input of electrical pulses. It is particularly applicable to a system using electrical pulses of a controlled amplitude and pulse width.

Before this invention, when an R-C circuit was used for timing purposes the voltage across the capacitor was sensed by a high impedance means and a signal was produced by said means when the voltage on the capacitor reached a predetermined level. Many well known devices, for example, static overcurrent relays, utilize this type of timing circuit operation. In the operation of these circuits the charge, which may be a function of either current or voltage, is often placed on a capacitor in controlled increments that reflect the time-current level of the pulses. When the charge on the capacitor reaches the selected level, at a predetermined time-current level, it is sensed by a voltage responsive means such as a flip-flop circuit, voltmeter, zener diode, or other similar device that will produce a signal or pass current when a certain voltage level is reached.

In order to make these circuits function with the accuracy that is normally required, it is necessary that the power contained in each increment exceed the power requirement to operate the voltage responsive means and operate any subsequent device. Electronic devices such as zener diodes, flip-flop circuits, and avalanche semiconductor devices (such as unijunction transistors) exhibit a positive resistance just before switching action takes place. This positive resistance draws current from the charging capacitor therefore lowering the charge on the capacitor. This requires the charging current increments to be relatively high for proper operation. This limits the accuracy of timing since the energy is taken from the capacitor itself to furnish the power necessary if the increments are relatively small. Since the pulse increment must be relatively large, relatively large capacitance values must be used to obtain the necessary length in the timing cycle. The use of large pulses and large capacitors tends to lower the accuracy of this circuit for metering or timing purposes.

In the described embodiment of this invention an R-C circuit is utilized to produce the electrical signal when the potential across a capacitor reaches a predetermined level. However, the energy for producing the electrical signal or operating subsequent circuitry is not taken from the charge on the capacitor nor from the pulse charging the capacitor. The capacitor charge increases at a uniform rate even at the point of breakdown of the voltage responsive means. Therefore, the energy drawn during the point of producing the electrical signal does not vary the timing operation.

The objects of this invention are: to provide means for sensing the electrical energy stored in a timing control circuit without using voltage sensing devices connected directly across the storage means; to eliminate the requirement of removing energy from a storage means or a timing control circuit in order to produce a sustained output for effectuating a switching or similar function; to substantially reduce the size of the timing capacitor in a timing control circuit while maintaining relatively long timing action with the required accuracy; to provide a new and improved timing control circuit; to provide a new and improved timing control circuit for use with static overcurrent devices and similar devices; to provide a timing control circuit that is substantially accurate; and to provide a new and improved timing control circuit that responds to a pulsating electrical input.

Figure 1:
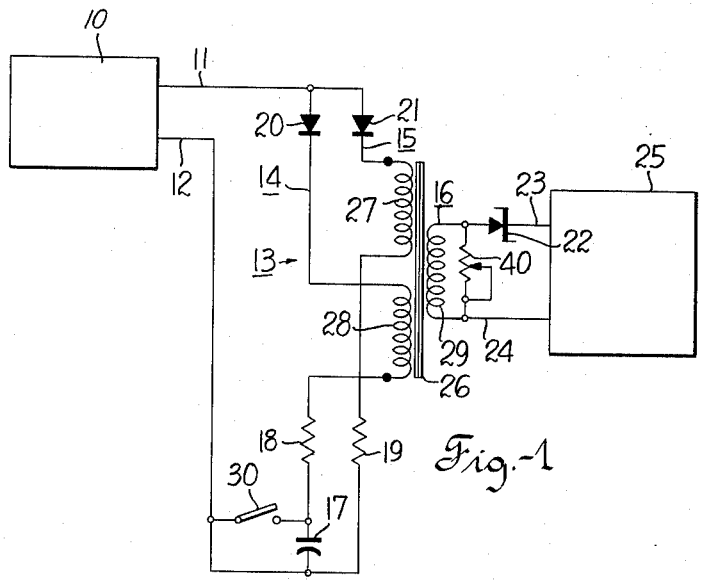
FIGURE 1 is a schematic drawing of a timing control circuit or device embodying this invention.

Referring to FIGURE 1, a source of electrical pulses is furnished by an input source 10. Input source 10 produces electrical pulses that may be varied or controlled in width, frequency, or amplitude. The pulses may be in response to conditions in another circuit, such as in a static overcurrent relay, or they may be the output of any other appropriate circuit. In the normal operation of this device these pulses are of a constant or substantially constant amplitude. However, variations of this device could use an input of a varying amplitude if this contributed to a desired result.

The electrical pulses are delivered by conductors 11 and 12 to a timing control device, or means 13. Timing control device 13 comprises a first circuit 14, a second circuit 15, and means 16 for producing an electrical signal when the difference of the current flow in circuit 14 and circuit 15 exceeds a predetermined level. Impedances, such as resistors 18 and 19, are connected in series in circuit 14 and circuit 15, respectively. These resistors may be adjustable to vary the timing response. Circuit 14 comprises storage means, such as a capacitor 17, for storing electrical energy received from input source 10. A means for blocking the current flow in the direction opposite to the current flow from the electrical pulses is provide in circuit 14. This means may comprise a diode 20 connected in circuit 14 in the reverse biased direction relative to the electrical pulses to prevent the discharge of capacitor 17. Since it is increasingly reverse biased by the capacitor it also provides a means for varying or decreasing the current flow through circuit 14 as a differential function of its charge as a function of, or proportional to, the level of charge on capacitor 17.

A means for blocking reverse current flow, such as diode 21, is also connected in circuit 15 to block uncontrolled discharge current flow from circuit 15 between pulse intervals.

Means 16 comprises a means for producing a sensing voltage that is proportional to, or a function of, depending on circuitry design, the difference in current flow through circuit 14 and circuit 15 upon production of each of the electrical pulses. Means 16 also comprises a means, such as zener diode 22, responsive to the sensing voltage to produce the electrical signal when the sensing voltage exceeds a predetermined level. When the sensing voltage exceeds the breakdown voltage of zener diode 22 current will flow across conductors 23 and 24 into a circuit 25. Circuit 25 may be any device that is responsive to an electrical signal, for example, a triggering circuit in a static overcurrent relay.

The means for producing the sensing voltage comprises a means responsive to the current flow in circuit 14, such as input winding 28 of a transformer 26, for producing an output varying as a function of the current flow through circuit 14. It also comprises a similar means, such as input winding 27 of transformer 26, for producing an output varying as a function of current flow through circuit 15. And it also comprises means, such as an output winding 29 of transformer 26, responsive to the two outputs for producing a net output, the sensing voltage varying as a function of the difference between the two outputs.

A variable resistor 40 is connected across output winding 29 to provide for core reset by controlling the discharge of the induced current in output winding 29 when the voltage across the output winding is less than the breakdown voltage of zener diode 22.

The two input windings are wound in opposite directions relative to the current flow through them, have an equal number of turns, and equal resistances. Therefore, when the currents through the input windings are equal they will cancel out and no magnetic flux will be produced to affect output winding 29.

A means, such as switch 30, is provided to discharge the capacitor upon operation of the circuitry. This means may be manually or automatically reset when the electrical signal is produced.

In the operation of the device, the electrical pulses from input source 10 are conducted through circuits 14 and 15. Assuming capacitor 17 to be in a discharged condition and resistors 18 and 19 to be equal, the electrical pulses from input source 10 will cause two equal pulsating currents to flow through circuits 14 and 15. These equal currents flowing through input windings 27 and 28, respectively, will cancel each other out and no voltage will be induced in output winding 29. However, as the charge on capacitor 17 begins to build up from the electrical input pulses, the voltage on the capacitor will act as a counterelectromotive force and provide a gradually increasing amount of reverse bias for diode 20 which gradually decreases the magnitude of the current pulses through circuit 14 without affecting current flow through circuit 15.

As the voltage across capacitor 17 increases the current pulses through input winding 27 will decrease. This will result in the production of the sensing voltage pulses at output winding 29 that will increase as the charge on capacitor 17 increases.

When the sensing voltage pulse reaches the breakdown voltage of zener diode 22, current will flow through output winding 29 and zener diode 22 to circuit 25 which will be actuated.

The energy for the operation of circuit 25 and for overcoming the resistance of zener diode 22 at breakdown voltage is not taken from the capacitor but is taken from the pulse source. The charge on the capacitor is not distributed for purposes of sampling the charge for triggering zener diode 22 into conduction.

Figure 2:
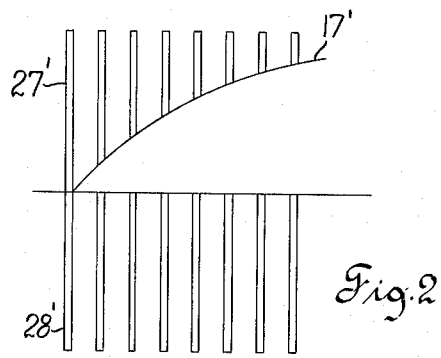
FIGURE 2 shows wave forms occurring in the circuitry of FIGURE 1.

FIGURE 2 shows the wave forms present in the circuitry. The pulses created by input source 10 are shown as they appear at input windings 27 and 28. The pulses in winding 27 are shown as pulses 27' and those induced in winding 28 are shown as 28'. As the pulses are introduced into circuits 14 and 15 a charge builds up on capacitor 17. This charge is shown as line or curve 17'. As charge builds up on capacitor 17 the pulses appearing across winding 27 vary inversely to the charge and depending on design factors may be decreased by an amount equal to the charge on the capacitor.

Figure 3:
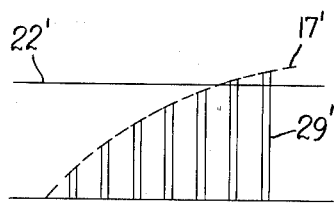
FIGURE 3 shows other wave forms occurring in the circuitry of FIGURE 1.

FIGURE 3 shows the effect of the decreased pulses across winding 27 to proportionally increase the sensing voltage pulses, pulses 29', induced in output winding 29. This induced voltage is a function of, or proportional to, the difference between the pulses 27' and 28' shown in FIGURE 2. The progressive increase of pulses 29 follows curve 17'. When these induced pulses 29' exceed the breakdown voltage of zener diode 22, indicated by line 22', current flows into circuit 25.

In describing the invention the preferred embodiment has been shown and described but it is obvious to one skilled in the art that there are many variations, combinations, and alterations that may be made without departing from the spirit and scope of the invention.

The embodiments of the invention in which an exclusive property or privilege is claimed are defined as follows:

1. A device for receiving electrical pulses and producing an electrical signal, said device comprising:
   a first circuit connected to receive the electrical pulses, said first circuit comprising storage means for accumulating electrical energy as a function of the total electrical energy received from more than one electrical pulse, said storage means connected to vary the current through said first circuit as a function of the electrical energy stored by said storage means and said storage means comprising means for preventing cyclic discharge of the storage means;
   a second circuit connected to receive the electrical pulses; and
   means connected to both the first circuit and the second circuit responsive to the current in the first and the second circuit for producing the electrical signal when said current through the first circuit reaches a predetermined level.

2. A device for receiving electrical pulses and producing an electrical signal; said device comprising:
   a first circuit connected to receive the electrical pulses, said first circuit comprising storage means for storing electrical energy received from the electrical pulses, said storage means connected to vary current from the electrical pulses through said first circuit as a function of the electrical energy stored by said storage means and said storage means comprising means for blocking current in a direction to prevent cyclic discharge of the storage means;
   a second circuit connected to receive the electrical pulses; and
   means connected to both the first circuit and the second circuit responsive to the difference between the currents in the first circuit and the second circuit for producing the electrical signal when said difference exceeds a predetermined level.

3. A device according to claim 1 wherein the means connected to both the first circuit and the second circuit is responsive to the currents in the first circuit and the second circuit to produce the electrical signal as an output when the difference between the current in the first circuit and the second circuit exceeds a predetermined level.

4. A device for receiving electrical pulses of controlled amplitude and producing an electrical signal at a predetermined time-current level of said electrical pulses, said device comprising:
   a first circuit connected to receive the electrical pulses, said first circuit comprising storage means for storing electrical energy received from the electrical pulses as a voltage, said storage means connected in series with means for decreasing the current from the electrical pulses through said first circuit as a function of the voltage of said storage means and said storage means comprising means for preventing cyclic discharge of the storage means;
   a second circuit connected to receive the electrical pulses; and
   means connected to both the first circuit and second circuit responsive to the difference between the current in the first circuit and the second circuit for producing the electrical signal when said difference exceeds a predetermined level.

5. A device according to claim 3 wherein the storage means is a capacitor.

6. A device for receiving electrical pulses of controlled amplitude and varying width and producing an electrical signal at a predetermined time-current level of said electrical pulses, said device comprising:
- a first circuit connected to receive the electrical pulses, said first circuit comprising a capacitor for storing electrical energy received from the electrical pulses as a voltage, said capacitor connected so that the current from the electrical pulses through said first circuit is decreased as a function of the voltage across said capacitor;
- means connected in the first circuit for preventing cyclic discharge of the storage means;
- a second circuit connected in parallel with the first circuit;
- means connected to both the first circuit and second circuit responsive to the difference in the current in the first circuit and the second circuit for producing a sensing voltage proportional to said difference; and
- means responsive to said sensing voltage for producing the electrical signal when said sensing voltage exceeds a predetermined level.

7. A device for receiving electrical pulses and producing an electrical signal, said device comprising:
- a first circuit connected to receive the electrical pulses, said first circuit comprising storage means for storing electrical energy received from the electrical pulses and said first circuit comprising means for blocking current in one direction to prevent cyclic discharge of the storage means;
- means responsive to the current in the first circuit for producing a first electrical output varying as a function of the electrical energy of each of the electrical pulses, said first electrical output further varying as a differential function of the level of the electrical energy stored by the storage means;
- a second circuit connected to receive the electrical pulses;
- means responsive to the current in the second circuit for producing a second electrical output varying as a function of the electrical energy of each of the electrical pulses;
- means responsive to the first output and the second output for producing a net output varying as a function of the difference between the first output and the second output; and
- means responsive to the net output for producing the electrical signal when said third output exceeds a predetermined level.

8. A device for receiving electrical pulses and producing an electrical signal, said device comprising:
- a first circuit connected to receive the electrical pulses, said first circuit comprising storage means for storing electrical energy received from the electrical pulses as a voltage and said first circuit comprising means for blocking current in one direction to prevent cyclic discharge of the storage means;
- means responsive to the current in the first circuit for producing a first electrical output proportional to the electrical pulses and reduced by the voltage of the storage means;
- a second circuit connected to receive the electrical pulses, means responsive to the current in the second circuit for producing a second electrical output proportional to the electrical pulses;
- means responsive to the first output and the second output for producing a third output varying as a function of the difference between the first output and the second output; and
- means responsive to the third output for producing the electrical signal when said third output exceeds a predetermined level.

9. A device for receiving constant amplitude electrical pulses and producing an electrical signal; said device comprising:
- a first circuit connected to receive the electrical pulses, said first circuit comprising a capacitor for storing electrical energy received from the electrical pulses as a voltage and comprising means for preventing cyclic discharge of the capacitor;
- means responsive to the current in the first circuit for producing a first electrical output proportional to the electrical pulses, said first electrical output also varying inversely to the voltage of the storage means;
- a second circuit connected in parallel with the first circuit;
- means responsive to the current in the second circuit for producing a second electrical output proportional to the electrical pulses;
- means responsive to the first output and the second output for producing a sensing voltage proportional to the difference between the first output and the second output; and
- means responsive to the sensing voltage for producing the electrical signal at a predetermined sensing voltage level.

10. An inverse time-current timing device responsive to electrical pulses for producing an electrical signal, said device comprising:
- a first circuit connected to receive the electrical pulses, said first circuit comprising a storage means for storing electrical energy received from the electrical pulses and means for blocking current flow in one direction to prevent cyclic discharge of the storage means;
- a second circuit connected in parallel with the first circuit, said second circuit comprising means for blocking current in one direction;
- inductance coupling means connected in the first circuit and in the second circuit for producing an output proportional to the difference between the current in the first circuit and the second circuit; and
- sensing means connected to receive the output and produce the electrical signal when said output reaches a predetermined level.

11. An inverse time-current timing device responsive to electrical pulses for producing an electrical signal, said device comprising:
- a first circuit connected to receive the electrical pulses, said first circuit comprising, connected in series, a capacitor, and a diode connected to prevent the discharge of the capacitor;
- a second circuit connected in parallel with the first circuit, said second circuit comprising a diode connected in the forward biased direction relative to the electrical pulses;
- a transformer having two equal input windings and an output winding, one of said input windings connected in series in the first circuit and the other in series in the second circuit, said input windings connected in opposite polarity relative to the electrical pulses; and
- voltage sensing means connected in series with the output winding for producing the electrical signal.

12. An inverse time-current timing device responsive to electrical pulses for producing an electrical signal, said device comprising:
- a first circuit connected to receive the electrical pulses, said first circuit comprising, connected in series, a diode connected in the forward biased direction relative to the electrical pulses, an impedance, and a capacitor;
- a second circuit connected in parallel with the first circuit, said second circuit comprising an impedance and a diode connected in series, said diode connected in the forward biased direction relative to the electrical pulses;

a transformer having two equal input windings and a output winding, one of said input windings connected in series in the first circuit and the other connected in series in the second circuit, said input windings connected in opposite polarity relative to the electrical pulse; and a zener diode connected in series with the secondary winding for producing the electrical signal.

13. In a static overcurrent relay responsive to overcurrent in an electrical system to produce constant amplitude electrical pulses and pulse width proportional to said overcurrent, a means for producing an electrical tripping signal at a predetermined time-current level of overcurrent, said means comprising:

a transformer having two equal input windings and an output winding, said input windings connected in opposite polarity relative to each other;

a first circuit connected to receive the electrical pulses, said first circuit comprising, connected in series, a diode connected in the forward biased direction relative to the electrical pulse, an impedance, one input winding of the transformer, and a capacitor;

a second circuit connected in parallel with the first circuit, said second circuit comprising, connected in series, an impedance, a diode, and the other input winding of the transformer, said diode connected in the forward biased direction relative to the electrical pulses; and a zener diode connected in series with the output to produce the electrical signal.

References Cited by the Examiner
UNITED STATES PATENTS

| | | | |
|---|---|---|---|
| 2,608,681 | 8/52 | Stevens | 323—48 |
| 2,998,551 | 8/61 | Moakler | 317—147 |
| 3,076,939 | 2/63 | Wycoff | 328—147 |

JOHN W. HUCKERT, *Primary Examiner.*